United States Patent Office 2,723,217
Patented Nov. 8, 1955

2,723,217
DENTIFRICE COMPOSITION CONTAINING TYROTHRICIN

Sol D. Gershon and Oscar W. Neiditch, Chicago, Ill., assignors to Lever Brothers Company, New York, N. Y., a corporation of Maine No Drawing. Application June 17, 1952, Serial No. 294,046

20 Claims. (Cl. 167—93)

This invention relates to a dentifrice and more particularly to a dentifrice comprising tyrothricin and an insoluble polymetaphosphate.

Tyrothricin is known to be an effective bactericide under certain conditions, and it has been employed in dentifrices but with varying results. Zander, Lisanti and Shiere, J. Dental Res., 30, 139 (1951), conclude that tyrothricin, in the dentifrices used, was ineffective in controlling hamster caries. The formulations of the dentifrices used were not revealed. Fosdick, Ludwick and Schantz, J. A. D. A., 43, 26 (1951), reported that tyrothricin was not retained on artificial dental plaques and was not effective in inhibiting acid formation in the plaques in vitro. Ludwick, Fosdick and Schantz, J. A. D. A., 43, 285 (1951), found tyrothricin-containing dentifrices to assist in reducing lactobacillus counts but questioned the statistical significance of their results and concluded that clinical testing of these dentifrices was not warranted. The dentifrice employed by Ludwick et al. contained dicalcium phosphate as the polishing agent.

In our research we have found that aqueous dispersions of tyrothricin are effective in reducing the lactobacillus count and in inhibiting the formation of lactic acid in vitro. However, in the presence of dicalcium phosphate, tricalcium phosphate or chalk, polishing agents customarily employed in dentifrice formulations, the tyrothricin displays a considerably reduced effectiveness. This is shown by the following experiments.

Tyrothricin was dissolved in a mixture containing distilled water, propylene glycol, sodium lauryl sulfate and soluble saccharin, the soluble constituents that are typical of a tooth paste. The tyrothricin concentration in the mixture was 0.13%. Gums were omitted in the formulations to facilitate manipulation and subsequent filtration. To separate portions (44 parts) of this mixture were added 54 parts of polishing agents, which is a proportion found in a typical tooth paste. The mixtures were allowed to stand for 24 hours, then diluted with distilled water to effect a 0.05% tyrothricin solution, assuming no adsorption or precipitation, centrifuged and filtered.

Using the filtrates, the first test used was designed to furnish information on the protein-combining ability of potential anti-caries agents and the ability of the agent-protein combination to inhibit acid formation by salivary microorganisms in the presence of glucose. In this test, tyrothricin is adsorbed by the casein in a manner which would be analogous to adsorption on protein dental plaques and is subsequently released in the presence of saliva to inhibit acid formation from glucose.

Casein powder (1.0 gram) was shaken with 25 cc. of the filtrates for 5 minutes. The treated casein was washed with distilled water and dried in a vacuum desiccator. One-tenth gram of the dried, treated casein was added to a tube containing 4 cc. of distilled water, 3 cc. of paraffin stimulated saliva and 1 cc. of 16% sterile glucose solution. The mixture was incubated at 37° C. with occasional agitation for 4 hours, at the end of which time lactic acid content was determined. The results were compared with a control in which the casein was treated with the liquid mixture which had not been mixed with a polishing agent. The results of this test were as follows:

| Polishing Agent | Relative Acid Inhibition |
|---|---|
| None—control | 100 |
| Dicalcium phosphate | 9 |
| Tricalcium phosphate | 0 |
| Chalk (calcium carbonate) | 2 |

The results demonstrated that in the presence of chalk, dicalcium phosphate and tricalcium phosphate, tyrothricin was not available in the liquid portion of the dentifrice for adsorption by the casein. Evidently the tyrothricin was withheld in some way, possibly by adsorption or by precipitation.

In another experiment, the filtrates of the previously mentioned mixtures of tyrothricin solution and polishing agents were used to determine, directly, inhibition of acid production in saliva-glucose mixtures.

The filtrates were diluted with distilled water in the proportion of one to 200. If all the tyrothricin were present in the filtrates, the one to 200 dilution would contain 0.00025% tyrothricin. Four cc. portions of the diluted filtrates were mixed with 3 cc. of paraffin stimulated saliva and 1 cc. of 16% sterile glucose and the mixtures incubated at 37° C., with occasional agitation, for 4 hours, at the end of which time lactic acid content was determined. These results were compared with a control using the liquid mixture which had not been exposed to a polishing agent.

The results of the test were as follows:

| Polishing Agent | Relative Acid Inhibition |
|---|---|
| None—control | 100 |
| Dicalcium phosphate | 32 |
| Tricalcium phosphate | 0 |
| Chalk (calcium carbonate) | 3 |

The results demonstrated, as in the first experiment, that in the presence of chalk, dicalcium phosphate and tricalcium phosphate, tyrothricin was removed from the liquid portion and thus, was not available to inhibit the formation of acid in the saliva-glucose mixture.

It is rather generally accepted that dental caries result partially, if not entirely, from the growth of microorganisms producing lactic acid which when held in contact with the teeth attacks the teeth and causes the decay. It is evident that if the tyrothricin in the presence of chalk, dicalcium and tricalcium phosphate is not effective to inhibit the production of lactic acid, dentifrices containing such polishing agents will not be effective in preventing the development of caries.

In accordance with the instant invention, a water-insoluble salt of a polymetaphosphoric acid is incorporated in a tyrothricin-containing dentifrice in substitution for from 5 to 95% of the calcium and magnesium carbonates and phosphates heretofore employed as polishing agents. Tests indicate that in the dentifrices thereby obtained the tyrothricin was available in a homogeneously dispersed and highly effective form, which was not the case when the insoluble polymetaphosphate was absent. When, for example, the casein test previously described was applied to a formulation containing 3 parts of insoluble sodium polymetaphosphate (4% soluble phosphates) to each part of dicalcium phosphate, the lactic acid inhibition was 60%. In the case of a formulation containing 1 part insoluble sodium polymetaphosphate (4% soluble phosphates) to each part of dicalcium phosphate, the lactic acid inhibition was 39%. When the saliva-glucose test previously described was applied to a formulation containing 3 parts of insoluble sodium polymetaphosphate (4% soluble phosphates) to each part of dicalcium phosphate, the lactic acid inhibition was 96%. In the case of a formulation containing 1 part insoluble sodium polymetaphosphate (4% soluble phosphates) to each part of dicalcium phosphate, the lactic acid inhibition was 76%.

Tyrothricin is an anti-bacterial substance produced by the growth of Bacillus brevis Dubos (fam. Bacteriaceae). It consists principally of 20 to 25% gramicidin and approximately 60% tyrocidine, the latter usually present as the hydrochloride. Substances other than gramicidin and tyrocidine are also present, and these also are thought to have anti-bacterial properties.

Tyrothricin occurs as a white, grayish-white or brownish-white powder. It is odorless and almost tasteless and is practically insoluble in water. However, it is soluble in ethyl alcohol to the extent of 1 gram per 15 cc., possibly leaving a small residue, slightly soluble in acetone and freely soluble in glacial acetic acid. Usually it is incorporated in a dentifrice composition in the form of the alcohol solution or dissolved in propylene glycol. Tyrothricin extracts of varying purity are available. Relatively pure forms of tyrothricin are preferably employed in the compositions of the present invention, i. e., tyrothricins having a purity of 70 to 100%. Utilization of the relatively impure extracts is made possible by using proportionately larger amounts of the extract, bearing in mind that the dentifrices of the invention should contain at least about 0.005% up to about 0.5% tyrothricin by weight of the composition for the desired effect. The upper limit is not critical, and depends upon the particular requirements, but usually not more than 0.5% would be employed.

Polymetaphosphoric acids exist in a number of forms and constitute a very complex system. The question of the molecular species that exist has been an outstanding and difficult puzzle in inorganic chemistry. The water-solubility of the salts of these poly acids varies from very soluble to insoluble. The water-soluble polymetaphosphates are to be carefully distinguished from the water-insoluble polymetaphosphates; the latter are employed in accordance with the instant invention, and the former are not, except as they may be present in small quantities, up to about 4%, as impurities. Maddrell's salt, obtainable by heating sodium dihydrogen phosphate at 300 to 400° C. for several hours, and Kurroll's salt, obtained by heating sodium or potassium dihydrogen phosphate below fusion for long periods of time, are examples of insoluble sodium polymetaphosphates coming within the invention. Pascal's salt, sodium dimetaphosphate, sodium trimetaphosphate (Knorre's salt), sodium tetrametaphosphate and sodium hexametaphosphate (Graham's salt) are examples of soluble polymetaphosphates which are outside the scope of this invention.

A particularly desirable product is the insoluble sodium polymetaphosphate of commerce which contains up to 4% soluble phosphates and upwards of 96% insoluble polymetaphosphates. A polymetaphosphate which is 100% insoluble in water can be used, and in its presence more tyrothricin is available than when dicalcium phosphate, for example, is the only polishing agent.

Any metal salt of a polymetaphosphoric acid can be used. The alkali metal salts, particularly the sodium and potassium salts, are the most available and therefore are preferred.

The insoluble polymetaphosphate is too abrasive to be employed as the sole polishing agent in the composition. Moreover, it is quite acidic and must be buffered to keep the pH of the dentifrice within the desired range, approximating the neutral point, and preferably within the range from 6 to 7.

For this reason, at least 5% of the insoluble polymetaphosphate is replaced by another polishing agent selected from the group consisting of magnesium and calcium carbonates and phosphates. It is desirable to maintain the amount of this supplemental or diluent polishing agent at the minimum necessary to adjust the pH of the dentifrice within the desired range and reduce the abrasive action of the polymetaphosphate to a comfortable level and therefore an amount within the range from 5 to 50% of the total polishing agent would ordinarily be preferred.

It is not necessary that all of the polishing agent be insoluble polymetaphosphate and magnesium or calcium carbonate or phosphate. Varying proportions can be used, if desired, of other polishing agents including bentonite, kaolin, ground bone meal, calcium sulfate, alumina gel, pumice, titanium dioxide, silica, whiting tin oxide, hydrated magnesia, magnesium trisilicate and talc.

The dentifrice usually will contain from about 30% to about 99.5% of the above-described mixture of polishing agents depending upon the physical state of the dentifrice. Preferably from 50% to 60% is used in a tooth paste and 95.5 to 98% in a tooth powder.

In addition to the polishing agent and tyrothricin, which are essential ingredients, the dentifrice can contain as optional ingredients a soap or synthetic detergent as a surface tension depressant. Soaps of high molecular weight fatty acids, including, for example sodium and potassium soaps of myristic, stearic and palmitic acids and the fatty acid mixtures from palm oil and coconut oil, as well as diglycol laurate, diglycol stearate and glycostearine can be employed. Typical synthetic detergents include the alkyl sulfates and sulfonates having alkyl groups of from about 8 to about 18 carbon atoms such as sodium lauryl sulfate, the sulfated fatty alcohols derived from coconut oil and palm oil, sodium cetyl sulfate, sulfated sperm oil fatty alcohols and sodium oleyl sulfate, salts of fatty acid amides of taurines (the Igepons) such as sodium palmitic methyl tauride, sulfated glycerides such as oleyl, stearic, palmitic and ricinoleic glycerides, usually in the form of mixed glycerides, and sulfonated hydrocarbons having from 8 to 20 carbon atoms such as sulfonated decanes, dodecanes and octadecanes.

Other optional conventional components of dentifrices which may be present include flavoring materials, oxygen releasers such as perborates, sweeteners such as saccharin and harmless coloring materials, in proportions to give any desirable effect.

In a preferred embodiment of the invention, the dentifrice is in the form of a paste, and in this event it will contain a carrier and softener and a binder in amounts to give the dentifrice a smooth texture and good flowability. Glycerin and sorbitol are preferred carriers and softeners, but ethyl alcohol, mineral oil, syrup, glucose and invert sugars, glycols and honey can also be employed. As binders there can be used gum tragacanth, viscarin, carboxymethyl cellulose, Indian gum, Irish moss, starch, silica gel, colloidal clays, acacia gums, agar-agar, locust bean gum, pectin and petrolatum. Those skilled in the art know other carriers and softeners, and binders.

The following are general formulations of tooth pastes and powders coming within the scope of the invention:

*Tooth paste*

|  | Permissible Range [1] | Preferred Range [1] |
| --- | --- | --- |
| Tyrothricin | 0.005 to 0.5 | 0.02 to 0.1. |
| Total polishing agents | 20 to 80 | 50 to 60. |
| Insoluble polymetaphosphate c't'g. up to 4% soluble phosphates. | 1 to 76 | 25 to 57. |
| Calcium and magnesium carbonates and phosphates, and others. | 76 to 1 | 2.5 to 30. |
| Carrier and softener | 5 to 70 | 15 to 40. |
| Binder | 0.5 to 30 | 0.7 to 5. |
| Miscellaneous | 5 to 70 | 15 to 40. |
| Flavor | 0.01 to 5 | 0.8 to 2. |
| Water | 4 to 60 | 15 to 30. |
| Surface tension depressant | 0.01 to 6 | 0.5 to 3. |

[1] Parts by weight.

*Tooth powder*

|  | Permissible Range [1] | Preferred Range [1] |
| --- | --- | --- |
| Tyrothricin | 0.005 to 0.5 | 0.02 to 0.2. |
| Total polishing agents | 88 to 99.5 | 95.5 to 98. |
|   Insoluble polymetaphosphate c't'g. up to 4% soluble phosphates. | 5 to 95 | 40 to 95. |
|   Calcium and magnesium carbonates and phosphates, and others. | 95 to 5 | 5 to 50. |
| Miscellaneous | 0.5 to 10 | 2 to 4. |
|   Flavor | 0.01 to 5 | 1 to 3. |
|   Surface tension depressant | 0.01 to 6 | 0.5 to 3. |

[1] Parts by weight.

The following examples are given to further illustrate the invention:

Example 1

The following is an example of a series of tooth paste formulations:

|  | 1 | 2 | 3 |
| --- | --- | --- | --- |
|  | *Percent* | *Percent* | *Percent* |
| Tyrothricin |  | 0.05 | 0.05 |
| Insoluble sodium polymetaphosphate | 26.92 | 26.89 |  |
| Dicalcium phosphate | 26.91 | 26.89 | 53.78 |
| Gum tragacanth | 1.33 | 1.33 | 1.33 |
| Saccharin | 0.20 | 0.20 | 0.20 |
| Flavor | 0.90 | 0.90 | 0.90 |
| Sodium lauryl sulfate | 1.14 | 1.14 | 1.14 |
| Glycerin | 18.90 | 18.90 | 18.90 |
| Propylene glycol | 1.00 | 1.00 | 1.00 |
| Distilled water | 22.70 | 22.70 | 22.70 |
|  | 100.0 | 100.0 | 100.0 |

In all of the above formulations the tyrothricin was first dissolved in propylene glycol. The glycerin then was added and finally the distilled water to make the elixir. The elixir was then combined with the other components of the formulation.

Formula No. 1 above was the control in a series of studies on hamsters to determine anti-caries effectiveness of the formulations set forth above.

The results of these tests showed formulation No. 2 to be the most effective dentifrice, producing a 25.6% reduction in carious surfaces compared with the control. Formulation No. 3 did not produce a decrease in carious surfaces compared with the control.

It is apparent that the tyrothricin in the dentifrice including insoluble sodium polymetaphosphate is available to exercise an effectiveness in the reduction in hamster caries. The tyrothricin-dicalcium phosphate dentifrice was no more effective than the control.

Example 2

The following is another comparison of formulations of tooth paste:

|  | 1 | 2 |
| --- | --- | --- |
|  | *Percent* | *Percent* |
| Tyrothricin | 0.05 | 0.05 |
| Insoluble sodium polymetaphosphate | 36.00 |  |
| Tricalcium phosphate | 9.00 | 45.00 |
| Sodium carragheenate (Viscarin) | 1.30 | 1.30 |
| Saccharin | 0.20 | 0.20 |
| Flavor | 0.90 | 0.90 |
| Sodium lauryl sulfate | 1.14 | 1.14 |
| Glycerin | 22.71 | 22.71 |
| Propylene glycol | 1.00 | 1.00 |
| Distilled water | 27.70 | 27.70 |
|  | 100.0 | 100.0 |

These dentifrices were compared using a modification of the casein test described previously. A mixture of twenty-five grams of the paste to be tested and 25 cc. of distilled water was used to treat the casein, which, in turn, was tested for acid inhibition. The first formulation inhibited acid production 41%, while the second formulation inhibited acid production only 20%, showing that a higher proportion of the tyrothricin is available in the first formulation containing insoluble sodium polymetaphosphate than in the second formulation which does not contain the polymetaphosphate.

Example 3

A tooth paste of the following formulation is prepared:

|  | Percent |
| --- | --- |
| Tyrothricin | .01 |
| Insoluble sodium polymetaphosphate | 26.91 |
| Dicalcium phosphate | 26.91 |
| Gum tragacanth | 1.33 |
| Saccharin | 0.20 |
| Flavor | 0.90 |
| Sodium lauryl sulfate | 1.14 |
| Glycerin | 18.90 |
| Propylene glycol | 1.00 |
| Distilled water | 22.70 |
|  | 100.0 |

In a hamster test, this dentifrice produced a 15.2% reduction in caries compared to an identical tooth paste without tyrothricin, showing that tyrothricin in this dentifrice base is effective even in concentrations as low as 0.01%.

Following is a series of tooth powders containing tyrothricin. For comparison of activity these powders were suspended in water in the proportion of 0.5 gram of powder in 100 cc. of distilled water to give a concentration of 0.00025% tyrothricin, if all the tyrothricin were available. The suspensions were filtered and 4 cc. portions subjected to the saliva-glucose, incubation procedure described above. The observed inhibition of acid production is noted in the following examples.

Example 4

Tooth powders of the following formulation are prepared:

|  | 1 | 2 |
| --- | --- | --- |
|  | *Percent* | *Percent* |
| Tyrothricin | 0.05 | 0.05 |
| Dimagnesium phosphate | 8.00 | 97.05 |
| Insoluble sodium polymetaphosphate | 89.05 |  |
| Saccharin | 0.20 | 0.20 |
| Flavor | 1.40 | 1.40 |
| Sodium lauryl sulfate | 1.30 | 1.30 |
|  | 100.0 | 100.0 |

The first formulation inhibited acid production by 47% in the saliva-glucose test, while the second formulation did not inhibit acid production showing that an effective quantity of tyrothricin is available in the first formulation containing insoluble sodium polymetaphosphate which is not the case in the second formulation which does not contain the polymetaphosphate.

Tooth powders are prepared having the following formulation:

Example 5

|  | 1 | 2 |
| --- | --- | --- |
|  | *Percent* | *Percent* |
| Tyrothricin | 0.05 | 0.05 |
| Chalk | 22.00 | 97.05 |
| Insoluble sodium polymetaphosphate | 75.05 |  |
| Saccharin | 0.20 | 0.20 |
| Flavor | 1.40 | 1.40 |
| Sodium lauryl sulfate | 1.30 | 1.30 |
|  | 100.0 | 100.0 |

The first formulation, containing insoluble sodium polymetaphosphate, inhibited acid production 26% in the saliva-glucose test, while the second formulation did not inhibit acid production.

*Example 6*

Tooth powders are prepared having the following formulation:

|  | 1 | 2 |
|---|---|---|
|  | Percent | Percent |
| Tyrothricin | 0.05 | 0.05 |
| Trimagnesium phosphate | 17.00 | 97.05 |
| Insoluble sodium polymetaphosphate | 80.05 | --- |
| Saccharin | 0.20 | 0.20 |
| Flavor | 1.40 | 1.40 |
| Sodium lauryl sulfate | 1.30 | 1.30 |
|  | 100.0 | 100.0 |

The first formulation, containing the insoluble polymetaphosphate, inhibited acid production 44%, while the second formulation which does not contain the insoluble polymetaphosphate, inhibited acid production by only 6%.

*Example 7*

Tooth powders are prepared having the following formulation:

|  | 1 | 2 |
|---|---|---|
|  | Percent | Percent |
| Tyrothricin | 0.05 | 0.05 |
| Tricalcium phosphate | 7.00 | 97.05 |
| Insoluble sodium polymetaphosphate | 90.05 | --- |
| Saccharin | 0.20 | 0.20 |
| Flavor | 1.40 | 1.40 |
| Sodium lauryl sulfate | 1.30 | 1.30 |
|  | 100.0 | 100.0 |

The first formulation, containing insoluble sodium polymetaphosphate inhibited acid production 64%, while the second formulation, which does not contain the insoluble polymetaphosphate, inhibited acid production by only 6%.

*Example 8*

Tooth powders are prepared having the following formulation:

|  | 1 | 2 |
|---|---|---|
|  | Percent | Percent |
| Tyrothricin | 0.05 | 0.05 |
| Magnesium carbonate | 15.00 | 97.05 |
| Insoluble sodium polymetaphosphate | 82.05 | --- |
| Saccharin | 0.20 | 0.20 |
| Flavor | 1.40 | 1.40 |
| Sodium lauryl sulfate | 1.30 | 1.30 |
|  | 100.0 | 100.0 |

The first formulation, containing insoluble sodium polymetaphosphate, inhibited acid production 32%, while the second formulation, which does not contain the insoluble polymetaphosphate, did not inhibit acid production.

*Example 9*

Tooth powders of the following formulation are prepared:

|  | 1 | 2 |
|---|---|---|
|  | Percent | Percent |
| Tyrothricin | 0.05 | 0.05 |
| Dicalcium phosphate | 19.00 | 97.05 |
| Insoluble sodium polymetaphosphate | 78.05 | --- |
| Saccharin | 0.20 | 0.20 |
| Flavor | 1.40 | 1.40 |
| Sodium lauryl sulfate | 1.30 | 1.30 |
|  | 100.0 | 100.0 |

The first formulation, containing the insoluble sodium polymetaphosphate, inhibited acid production 48%, while the second formulation, which does not contain the insoluble polymetaphosphate, did not inhibit acid production.

It will be evident to those skilled in the art that many variations can be made in the composition of the dentifrices of the invention, and accordingly, the invention is not to be limited except as set forth in the appended claims.

All parts and percentages in the specification and claims are by weight.

We claim:

1. A paste dentifrice comprising from about 0.005 to about 0.5% of tyrothricin and from about 20 to about 80% of a mixture of polishing agents comprising from about 1 to about 76% of an insoluble salt of a polymetaphosphoric acid, and from about 76 to about 1% of a member of the group consisting of calcium and magnesium phosphates and carbonates.

2. A paste dentifrice comprising from about 0.005 to about 0.5% of tyrothricin and from about 20 to about 80% of a mixture of polishing agents comprising from about 1 to about 76% of an insoluble alkali metal salt of a polymetaphosphoric acid and from about 76 to about 1% of a member of the group consisting of calcium and magnesium phosphates and carbonates.

3. A paste dentifrice in accordance with claim 2 in which the alkali metal salt is a sodium salt.

4. A paste dentifrice in accordance with claim 1 in which one of the polishing agents is dicalcium phosphate.

5. A paste dentifrice in accordance with claim 1 in which one of the polishing agents is tricalcium phosphate.

6. A paste dentifrice in accordance with claim 1 in which one of the polishing agents is magnesium phosphate.

7. A paste dentifrice in accordance with claim 1 in which one of the polishing agents is calcium carbonate.

8. A paste dentifrice in accordance with claim 1 in which one of the polishing agents is magnesium carbonate.

9. A paste dentifrice in accordance with claim 1, which includes a carrier.

10. A paste dentifrice in accordance with claim 9 in which the carrier comprises aqueous glycerin.

11. A paste dentifrice in accordance with claim 9 in which the carrier comprises aqueous sorbitol.

12. A paste dentifrice in accordance with claim 9 which includes a surface tension depressant.

13. A paste dentifrice in accordance with claim 12 in which the surface tension depressant is a soap.

14. A paste dentifrice in accordance with claim 12 in which the surface tension depressant is a synthetic detergent.

15. A paste dentifrice in accordance with claim 1, which includes a binder.

16. A paste dentifrice in accordance with claim 15 in which the binder is a gum.

17. A powder dentifrice comprising from about 0.005 to about 0.5% of tyrothricin and from about 88 to about 99.5% of a mixture of polishing agents comprising from 5 to 95% of an insoluble salt of a polymetaphosphoric acid and from about 95 to about 5% of a member of the group consisting of calcium and magnesium phosphates and carbonates.

18. A powder dentifrice in accordance with claim 17 which includes a surface tension depressant.

19. A powder dentifrice in accordance with claim 18 in which the surface tension depressant is a soap.

20. A powder dentifrice in accordance with claim 18 in which the surface tension depressant is a synthetic detergent.

(References on following page)

References Cited in the file of this patent

UNITED STATES PATENTS

| | | |
|---|---|---|
| 2,019,142 | Kuever | Oct. 29, 1935 |
| 2,191,199 | Hall | Feb. 20, 1940 |

OTHER REFERENCES

Wessinger: Drug and Cosmetic Industry, vol. 70, March 1952, p. 387.

Ludwick: Journal of the American Dental Association, vol. 43, p. 285 (1951).

American Journal of Pharmacy, vol. 125, October 1951, p. 337.